No. 677,948. Patented July 9, 1901.
L. P. COWART.
DEVICE FOR MEASURING LOGS.
(Application filed Mar. 18, 1901.)
(No Model.) 2 Sheets—Sheet 1.

No. 677,948. Patented July 9, 1901.
L. P. COWART.
DEVICE FOR MEASURING LOGS.
(Application filed Mar. 18, 1901.)
(No Model.) 2 Sheets—Sheet 2.

Witnesses
F. L. Ourand.
J. E. Lambert

Inventor:
L. P. Cowart
By John L. Duffie
Attorneys

UNITED STATES PATENT OFFICE.

LAURANCE P. COWART, OF REDDING, TEXAS.

DEVICE FOR MEASURING LOGS.

SPECIFICATION forming part of Letters Patent No. 677,948, dated July 9, 1901.

Application filed March 18, 1901. Serial No. 51,702. (No model.)

*To all whom it may concern:*

Be it known that I, LAURANCE P. COWART, a citizen of the United States, residing at Redding, in the county of Tyler and State of Texas, have invented certain new and useful Improvements in Devices for Measuring Logs; and I do hereby declare the following to be a full, clear, and exact description of the invention, such as will enable others skilled in the art to which it appertains to make and use the same.

My invention is a device for measuring logs; and it consists of a pair of calipers, a measuring-segment, an arm, a plate, and a disk, containing figures, all constituting a device for measuring the number of lumber feet in a log.

Figure 1:
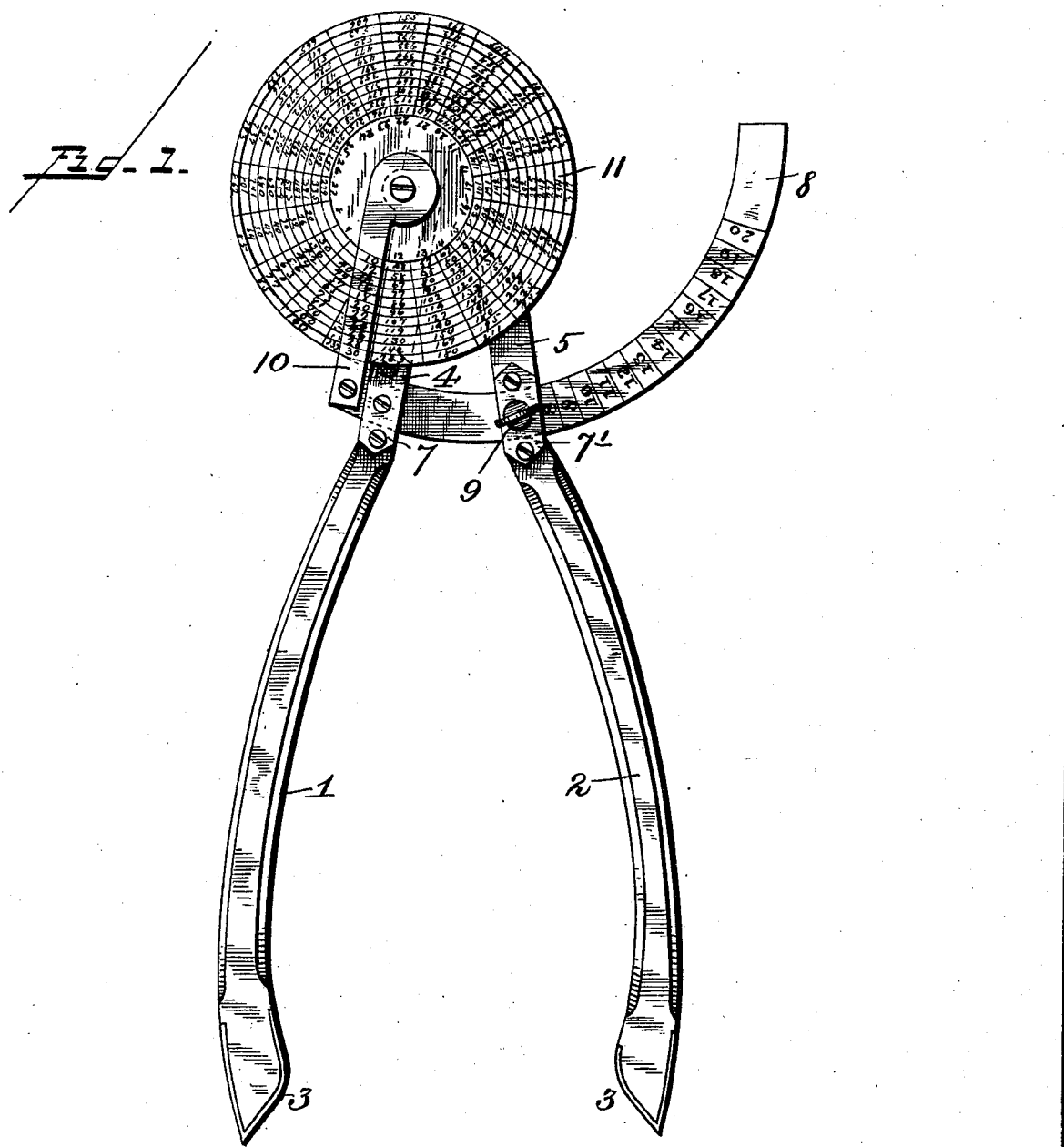
Figure 2:
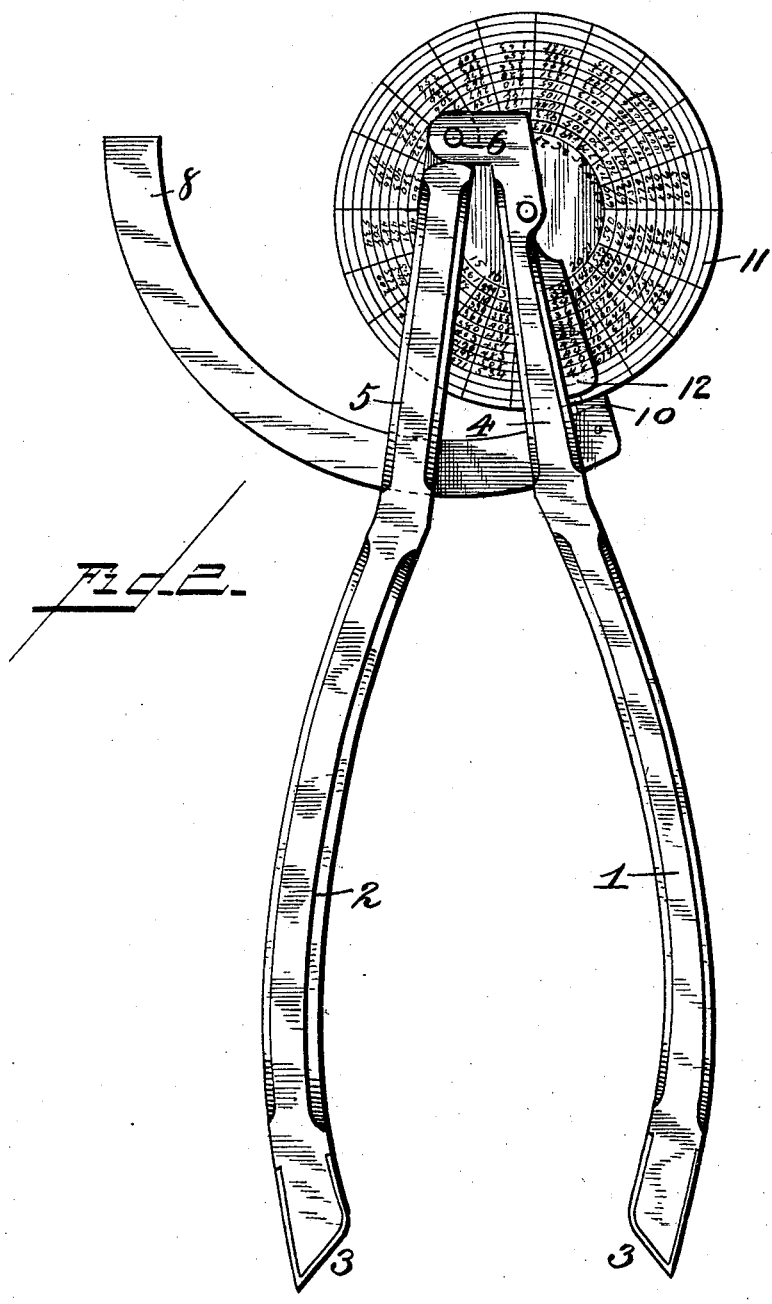

In the accompanying drawings, Figure 1 is a front elevation of my invention. Fig. 2 is a rear elevation of the same.

1 represents the left-hand leg of the calipers, and 2 represents the right-hand leg. 3 represents the feet. 4 represents the body or upper part of the left-hand leg, and 5 the body or upper part of the right-hand leg. These parts are hinged together at their upper ends by a hinge 6. (See Fig. 2.)

Where the bodies 4 and 5 are joined to the legs there is in each body a depression, over which are secured plates 7 and 7'. In one of these depressions is secured one end of a measuring-segment 8, while the other end slides back and forth in the depression in the other leg. In the plate of the right-hand body is a thumb-screw 9 to set the feet 3 in position. The said measuring-segment is laid off into equal divisions and numbered, beginning at "8" and running up to as many as may be desired. In my drawings, however, I have not extended the measurement above twenty divisions, deeming that sufficient to illustrate my device. Each division represents an inch at the feet 3. Thus when the right-hand plate 7' is at division "12" the feet are just twelve inches apart and when at "20" the feet are just twenty inches apart. Secured to the face and left-hand end of the measuring-segment 8 is one end of an arm 10, the other end being secured to the front face and upper end of the left-hand leg of the calipers, said arm being laid off into divisions representing feet from ten to thirty, and journaled between the upper end of this arm 10 and the upper part of the left-hand leg is a disk 11. This disk is divided into circles which correspond to the divisions laid off on the arm 10. Said circles are divided into twenty-seven radial divisions, and just inside of the inner circle is a circle of figures, one in each radial division, running from "8" to "27," thus completing the circle. The radial divisions between each circle are filled with figures, which, in combination with the figures on the measuring-segment 8, arm 10, and the figures inside of the inner circle, form a device for measuring the number of lumber feet in a log. On the front face and body 4 and extending beyond the left-hand edge of the same is secured a plate 12. (See Fig. 2.)

By turning the device over it will be seen that the rear part of the disk is a duplicate of the front part, except as to the figures, and on the rear side of the plate 12 are divisions and figures, indicating the length of a log from thirty-two to forty-eight feet, and the circular divisions on this rear side of the disk correspond exactly to the divisions on the plate 12, and the figures on the inside of the inner circle, which run from "12" to "27," taken in connection with the legs 1, measuring-segment 8, plate 12, and the figures thereon, constitute a device for ascertaining the number of lumber feet in a log. Hence the whole device, as illustrated, will give the number of lumber feet in a log from eight to twenty-seven inches in diameter and from ten to forty-eight feet long.

The measuring capacity of this device may be increased by increasing the size of the calipers, the length of the arm 10, plate 12, and the size of the disk and increasing the number of radial and circular divisions on its faces.

With this device, as illustrated, we can ascertain the number of lumber feet in any log running from eight to twenty-seven inches in diameter and from ten to forty-eight feet in length. Thus if we set the calipers with the figure "12" exactly at the left-hand edge of the plate 7' the feet 3 will just be twelve inches apart, and then we tighten the thumb-screw and step the log, and if the log be ten feet long the amount of lumber in it will be forty-eight feet, and if thirty feet long the amount of lumber in it will be one hundred and fifty-three feet, and if the log be twenty-seven inches in diameter and thirty feet long it will contain eight hundred and sixty-two feet. This is the extent of the scale of the front face of the disk. Now if we turn the device over and find the log to be twenty inches in diameter and thirty-two feet long it will contain four hundred and eighty feet, and if twenty-seven inches in diameter and forty-eight feet long it will contain fourteen hundred and twenty-eight feet. Thus it will be seen by this combination device we always have a device with which we can measure the diameter and length of a log and by simply turning the disk instantly find the number of feet therein.

Having described my invention, what I claim as new, and desire to secure by Letters Patent, is—

1. A log-measuring device, consisting of a pair of calipers, having a measuring-segment, divided into numbered divisions; a thumb-screw adapted to set the feet of said calipers; a plate secured to the upper part of one of the legs; the rear face of said plate divided into numbered divisions from "32" to "48," representing the number of length feet in a log; an arm divided into numbered divisions from "10" to "30," representing the length feet in a log, and having one end secured to one end of the measuring-segment, and the other end to the upper end of one of the legs of the calipers; a disk divided into radial and circular spaces on its front and rear faces and journaled between the arm and upper part of one of the legs; said radial and circular spaces being filled with figures adapted to assist in determining the number of lumber feet in a log, said legs, segment, plate, arm and disk together with the figures thereon, constituting a device for measuring and ascertaining the number of lumber feet in a log, substantially as shown and described and for the purposes set forth.

2. A log-measuring device, consisting of a pair of calipers; a measuring-segment 8; a thumb-screw 9, for holding the feet 3, in position; a plate 12, secured to the upper part of one of the legs, and bearing lines and figures on its rear face; an arm 10, one end secured to the upper part of one of the legs, the other end to one end of the measuring-segment, and bearing lines and figures on its front face; a disk journaled between said arm and upper part of one of the legs, and bearing on its front and rear faces, radial and circular lines and figures adapted to assist in determining the number of lumber feet in a log; said calipers, measuring-segment, plate, arm, disk, lines and figures arranged to measure and ascertain the number of lumber feet in a log, substantially as shown and described and for the purposes set forth.

In testimony whereof I affix my signature in presence of two witnesses.

LAURANCE P. COWART.

Witnesses:
JAMES L. KIRBY,
W. P. MAYO.